May 2, 1950
W. J. MILLER
2,506,377
METHOD AND APPARATUS FOR CONDITIONING AND SUPPLYING
CLAY TO POTTERY FORMING MACHINERY
Filed June 8, 1944
4 Sheets-Sheet 1
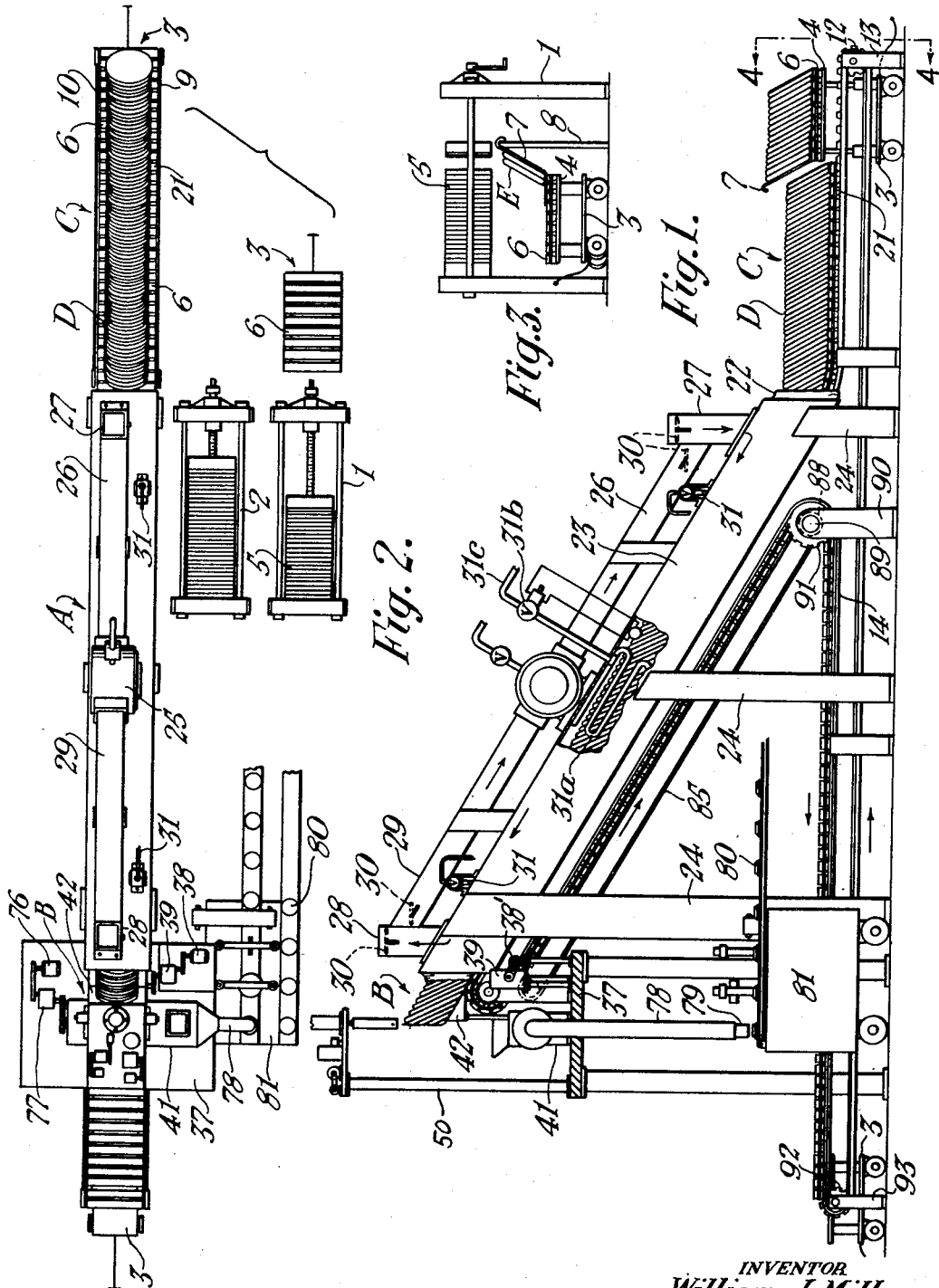
INVENTOR
William J. Miller.
BY
George J. Cuminger
ATTORNEY May 2, 1950 W. J. MILLER 2,506,377
METHOD AND APPARATUS FOR CONDITIONING AND SUPPLYING
CLAY TO POTTERY FORMING MACHINERY
Filed June 8, 1944 4 Sheets-Sheet 2
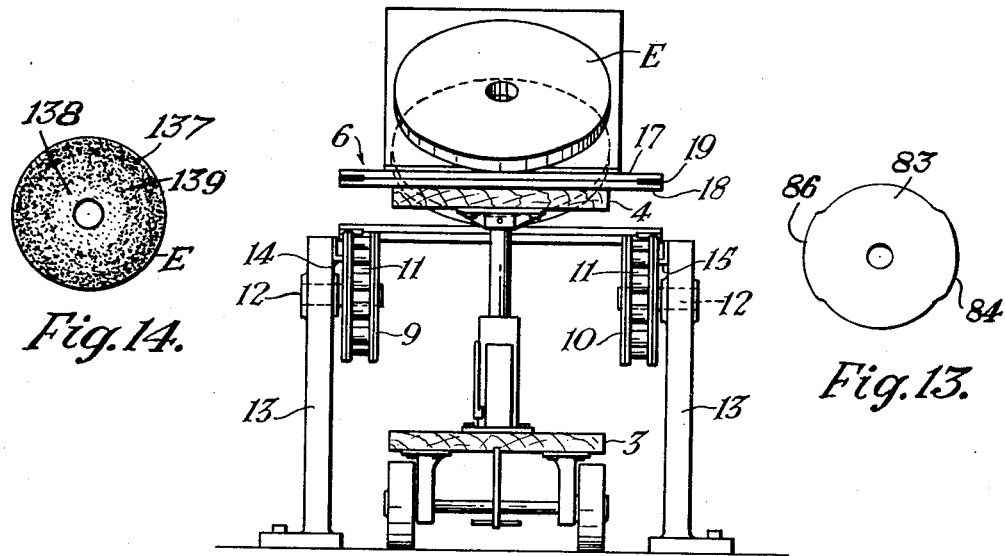
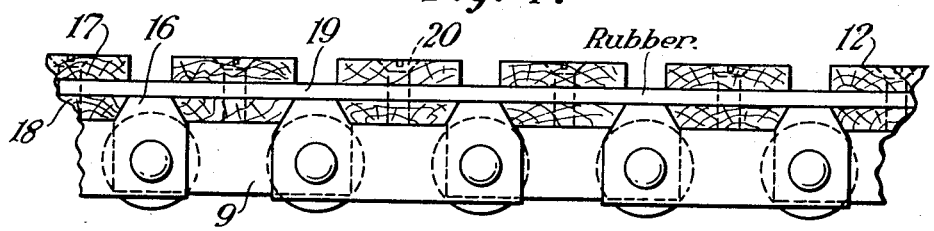
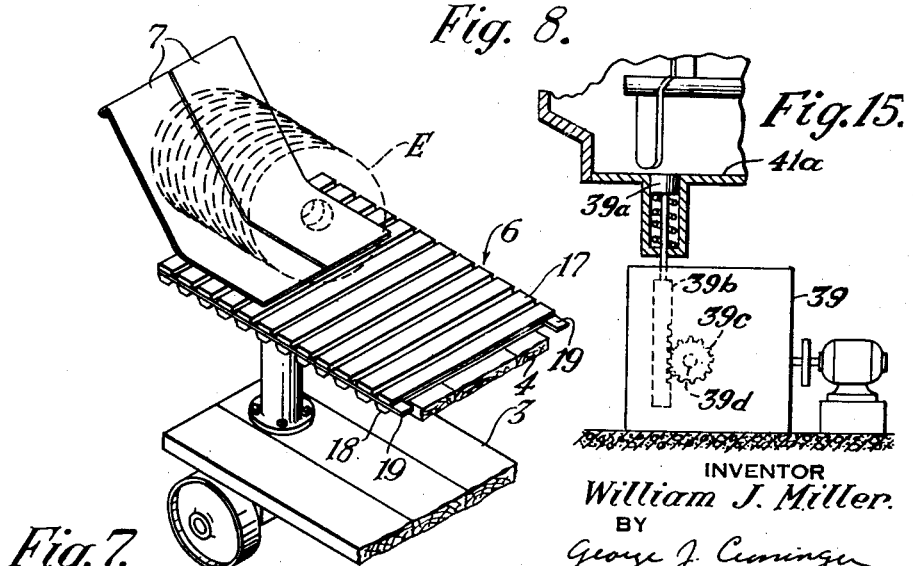
INVENTOR
*William J. Miller.*
BY
*George J. Cuminger*
ATTORNEY INVENTOR
William J. Miller.
BY
George J. Cominger
ATTORNEY May 2, 1950 W. J. MILLER 2,506,377
METHOD AND APPARATUS FOR CONDITIONING AND SUPPLYING
CLAY TO POTTERY FORMING MACHINERY
Filed June 8, 1944 4 Sheets-Sheet 4
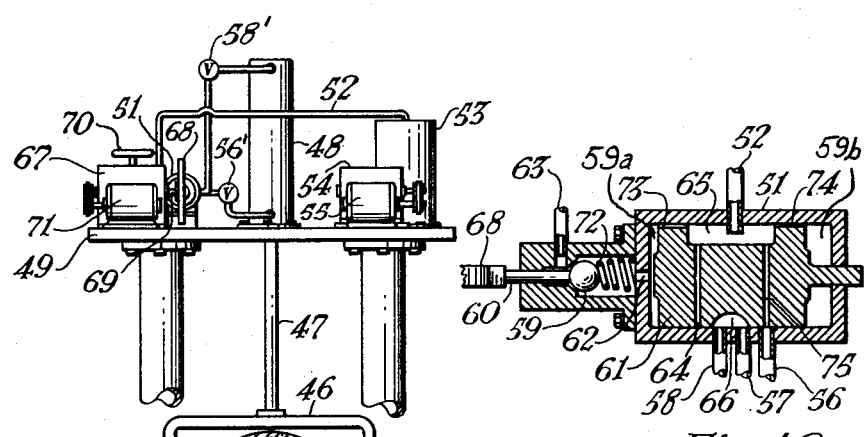
Fig. 10.
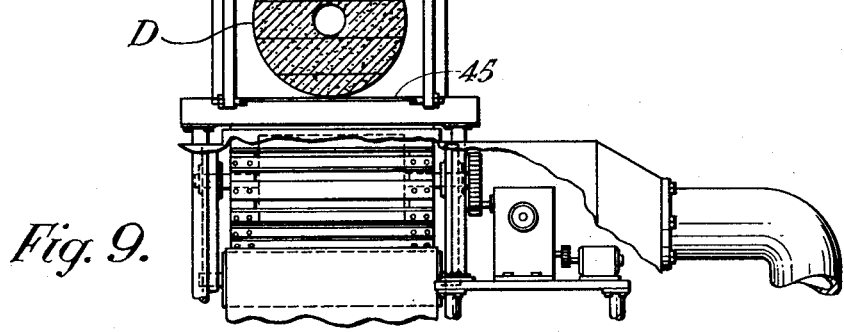
Fig. 9.
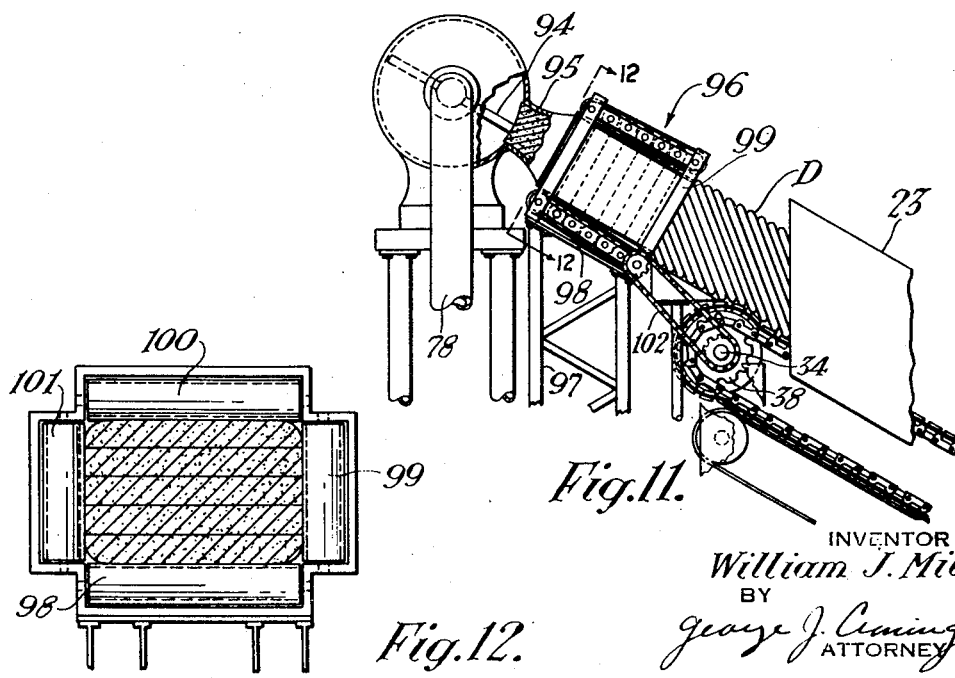
Fig. 11.
Fig. 12.
INVENTOR
William J. Miller
BY
George J. Cininger
ATTORNEY Patented May 2, 1950

2,506,377

UNITED STATES PATENT OFFICE 2,506,377

METHOD AND APPARATUS FOR CONDITIONING AND SUPPLYING CLAY TO POTTERY FORMING MACHINERY

William J. Miller, Swissvale, Pa., assignor to Miller Pottery Engineering Company, Swissvale, Pa., a corporation of Pennsylvania Application June 8, 1944, Serial No. 539,258

13 Claims. (Cl. 25—1)

This invention relates to methods and apparatus for conditioning and supplying clay to pottery ware forming machinery. It has to do particularly with a new system of handling clay between a source of supply, for instance a filter press and the ultimate point of use, for example the clay feeding stations of an automatic jiggering machine to thereby reduce labor hours and expense and to provide the jiggering machine with finer and more uniform texture clay and to reduce ware defects and rejects caused by lumps in the clay thereby reducing the cost of the ware and lastly to co-ordinate the supply of clay to the pug mill with that required by the jiggering machine.

All filter cakes have hard brims, soft center zones with the intermediate annular region having correct consistency for jiggering. Also all filter cakes are harder in that zone which is made at the top of the filter press and less hard at the zone which is made at the bottom of the filter press because the extruded water runs over the region at the bottom from above during pressing. Adjacent cakes of a pressing differ in average hardness due to the age of the filter bags, the cleanliness thereof or texture of weave. This is inherent and cannot be avoided. Also, the reserve stacks air dry at the periphery while awaiting use.

Heretofore, filter cakes have been removed from the filter press and stacked in twin, vertical columns on hand drawn trucks placed alongside the press and then manually trucked to the pug mill and there manually wire cut into quarters and chunks as large as can be conveniently handled containing about 800 cu. in. thrown into the pug mill by hand. There was no definite minute subdivision of the hard and soft zones of these large lumps prior to deposit in the pug nor subsequently within the pug to enable the pug knives to definitely blend said small subdivisions to thereby properly blend, homogenize, and plasticize the clay prior to discharge thereof from the pug barrel. The prior procedure involved three handlings of the material, one by the filter press operator, one by the truck puller and the third by the pug operator. The feed into the pug was spasmodic and there was no controllable predetermined volume delivery of clay into the pug mill to coordinate with the requirements of the jiggering machine. When the supply of clay falls below the demands, clay of a different texture and workability is supplied, production is necessarily curtailed with consequent increase in the cost of manufacture because of defective ware and idle machine crews. Large chunks of clay placed in the pug mill could not be macerated into the very fine aggregates required for subdividing by the pug into the fine textured clay required for optimum jiggering and production of lump free ware. A lump, hard or soft, less than ⅛", or slurry seam, will result in scrapping of the piece of ware. If the cakes were too hard generally to produce pugged clay of optimum softness the adding of water in the pug was not practicable because the mass remains only a fraction of a minute in the pug which is not sufficient time to disintegrate large lumps and thereafter raise the water content uniformly through the mass and the water will mix first with the soft clay. Should the pug mill become glutted from an oversupply of clay, then the texture and workability of the clay supplied is not the same as when the pug supply is inadequate. A uniform supply of clay, continuously delivered, that is to say not spasmodic or with long intervals in between, insures clay of uniform texture plasticity and workability providing it is not lumpy to start with.

In the present invention, I propose to place the truck directly under the press and drop the filter cakes in uniform progressive order directly on a truck as they are released from the filter press and to arrange the cakes in horizontally stacked relation with that portion of the filter cakes which is formed at the top of the press and is the dryest portion of the cake, uppermost and to do this by pulling the top of each cake outwardly in the press and permitting it to fall inclined into the desired arrangement. Truck loads of cakes are taken directly to a zone where they are added to the trailing end of a procession of filter cakes which is being transported in endwise fashion to a cutting off point. The hard and soft zones of successive cakes in the procession are arranged in overlapping relation relative to the cutting plane. Preferably, the procession first travels for a substantial period of time through a treating zone wherein surface moisture is added only to the harder brim zones and onto the top brim portion additionally spraying mist moisture, the atmosphere in the treating zone being highly humid and preferably hotter than the cakes to facilitate moisture deposit thereon through sweating, all subject to regulations to establish and maintain prior to subdivision optimum water proportion of the mass as batches of cakes in the procession progress, and then subdividing and thereafter intermingling and deposit in the pug. At the cutting off position, preferably relatively thin slices or wafers of clay are segregated from the procession by passing a cutting implement through a plurality of overlapping cakes, the cut preferably starting at the perimeter of the procession, said slice preferably folding or curling as it is detached, to further intermingle the hard brim portion with the softer portions of the slice. By slicing the material thin, large lumps in the pug supply are eliminated and the slice can be more completely and efficiently further subdivided and plasticized by the pug mill knives into minutely fine aggregates necessary for optimum fine texture jiggering clay and lump free ware. The slices are cut off periodically and deposited directly or indirectly in the pug mill. The volume delivery of clay into the pug is coordinated with the jiggering machine's requirements through automatic or manual control over the rate of feed of the procession of filter cakes to the cutting off point and the thickness of the slice by varying the periodicity of the stroke of the cutting implement and the shape of the curl by the rapidity of the stroke while cutting.

I thus substantially reduce pottery ware production cost by eliminating the pug feeding individual, reducing ware rejects chargeable to lumpy and off-consistency clay and insuring continuous production.

In the drawings:

Figure 1 is a side elevation of the preferred form of apparatus.

Figure 2 is a top plan view of the apparatus of Figure 1.

Figure 3 is a side elevation of a filter press showing a lift truck in loading position.

Figure 4 is an end view of the apparatus of Figure 1 taken in the direction of arrows 4—4 showing the loading end of the structure only.

Figure 7 is a perspective view showing part of truck for transporting filter cakes between the filter presses and the loading end of the conveying means.

Figure 8 is a fragmentary detail partly in section showing a portion of the conveying means.

Figure 9 is an enlarged detail of the segregating apparatus.

Figure 10 is a detail in section of a control valve.

Figure 11 is a side elevation illustrating modifications in the discharge end of the apparatus.

Figure 12 is an end view taken in the direction of arrows 12—12 of Figure 11, of a reducer.

Figure 13 is a detail illustrating another form of cam for use with the cutting off apparatus.

Figure 14 is a detail illustrating a filter cake.

Figure 15 is a detail illustrating how the travel of the filter cake conveyor may be automatically varied.

Figures 5, 6:
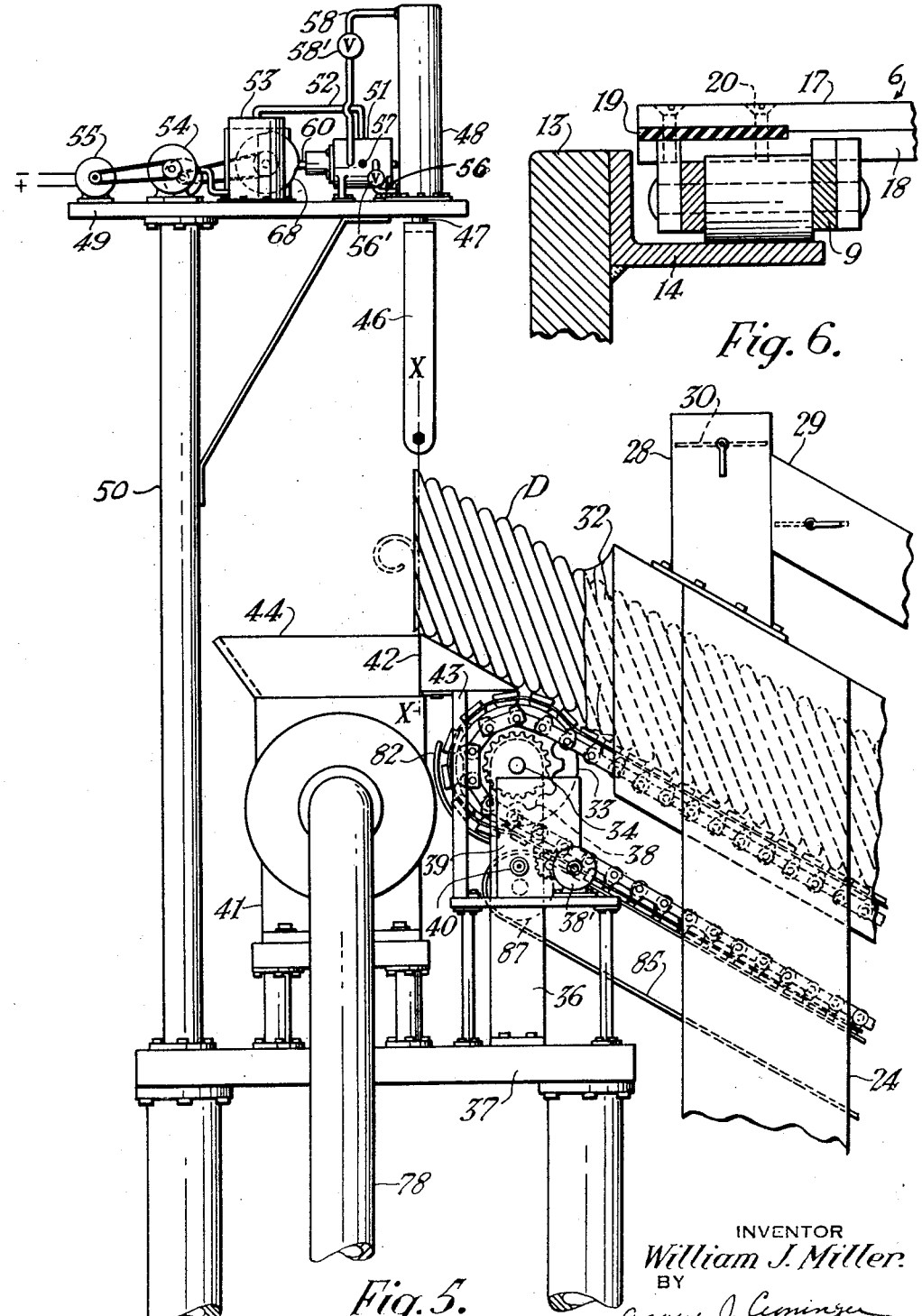
Figure 5 is an enlarged detail in side elevation of the discharge end of the apparatus.
Figure 6 is an enlarged fragmentary detail of the sectional conveyor.

With reference to Figures 1 and 2, it is preferred to locate the conventional filter presses 1 and 2 adjacent the apparatus A for transporting the filter cakes to a segregating position B in order that the press operator may conveniently and in less time than ordinary, truck the output of the filter presses to the loading end C of the apparatus.

When a filter press is to be emptied, a wheeled lift truck 3, Figures 3 and 7, with the elevatable platform 4 in lowered position is maneuvered into position directly underneath press plates 5. As the filter cakes E are successively released by opening the bottom of the bags, they fall in brimwise fashion directly onto a support 6, Figure 3, removably carried by the truck platform where they are arranged horizontally in inclined position against a thin section, rigid, divided backstop 7, held in upright position by temporary props 8, Figure 3, until the truck is loaded. The upright wall of the backstop is inclined to the vertical at approximately the same angle as the main procession of filter cakes D, Figure 1, to enable the group of filter cakes on the truck to be joined to the trailing end of the procession D at the proper angle in a manner to be described.

Support 6 is formed as a detachable load bearing portion of a conveyor composed of spaced, parallel roller chains 9 and 10, Figures 2 and 4 which in the loading zone C are carried by sprockets 11 mounted on stub shafts 12 supported by posts 13. The chain rollers of the top strands run on spaced parallel rails 14 and 15 throughout this zone. Each conveyor chain is formed with spaced upstanding tapered chain lugs 16, Figure 8, to thereby provide for an interfitting relation with the support 6 which is constructed of spaced pairs of rigid upper and lower slats 17 and 18, Figures 6 and 8, joined at the ends to marginal strips 19 of resilient or flexible material such as rubber or fabric by screws 20. The upper slats form a non-slip load receiving surface, and the underneath slats are tapered along the edge near the ends to be received in the notches formed between chain lugs 16. Support 6 is preferably of a length to receive one press load of filter cakes when filled and is wider than the truck platform 4, see Figure 4.

To join a truck load of filter cakes to the trailing end of column D, Figure 1, the truck is backed into the open end of the conveyor between posts 13 with the platform and support 6, raised to clear the chains 9 and 10. When the leading end of the trucked support 6 and the trailing end of the preceding conveyor borne support 21 abut, platform 4 is lowered to thereby deposit support 6 on the conveyor chains in abutting relation with support 21 and the backstop 7 against the face of the last filter cake in column D. The backstop 7 is quickly removed by pulling the sections out laterally from under the front cakes which fall forwardly a short distance equal to the thickness of the backstop against the main column of cakes D, the weight of the material and its normally sticky, plastic condition causing the entire mass to be more or less stuck tightly together.

At the end of a short horizontal run in the loading zone C, the conveyor curves upwardly on rails 14 and 15 through a sealing boot 22, Figure 1, into an inclined humidifying chamber 23 supported by uprights 24.

Inside the chamber, the column D is exposed to the action of a highly humid atmosphere which is circulated by a blower 25 and exhausted into the lower end of the chamber through pipe 26 and stack 27, and sucked out of the upper end of the chamber and back to the blower 25 through stack 28 and pipe 29. Dampers 30 are provided to control circulation and humidifiers in the form of valved pipes 31 having nozzles (not shown) inside the chamber are provided to spray water mist or steam thereinto under controlled pressure to thereby wet the tops of the filter cakes which are the hardest portions thereof as explained previously. Steam coils 31a are to heat their chamber when desired and are controlled by valve 31b in steam line 31c.

The column of clay D emerges from the chamber at an upper level through a sealing boot 32, Figure 5, and the slatted support 6, may be received on a smooth surfaced drum 33 rotatable by sprocket shaft 34, which is rotatable in bearings 35, mounted on posts 36 secured to elevated pug platform 37. The drum is larger in diameter than the drive sprockets 38, on shaft 34 to lift the slats out of the notches between chain lugs when the chain starts to curve around the sprockets to compensate for difference in pitch diameter of chains 14 and 15 and support 6. Where the straps 19 of supports 6 are formed of resilient material, the drum may be omitted because the rubber will stretch and allow the support 6 to travel around the sprockets with the chains. Said sprocket shaft 34 is driven by a motor 38′, Figure 5, mounted on the platform, through a variable speed transmission 39 having a manual control 40 to regulate the speed of travel of the conveyor and hence the column to that required to supply the requirements of the forming machine through the pug mill 41. If desired, an automatic control may be provided, for instance, by means of a pressure sensitive member 39a, Figure 15, arranged to reflect the clay pressures inside the pug mill barrel 41a at or near the delivery end thereof and transmit them to a member, for example a rack 39b which engages a pinion 39c on a control shaft 39d of variable speed transmission 39.

The leading end of the column D is received on a stationary inclined ramp 42, Figures 1 and 5 supported on posts 43 secured to platform 37. It is caused to slide thereover and be projected outwardly therefrom by the upward thrust of the balance of the column of clay into a cutting off position over or adjacent the hopper 44 of pug mill 41. The natural adhesive bond between the filter press cakes enables the forward end of the column to be projected outwardly into an unsupported position beyond the end of the ramp without sagging or breaking off, although it is preferred to cut through the column at or adjacent the upper end of the ramp to provide resistance to the cutting wire and control the path and manner of slice fall and position of deposit in the pug hopper.

The lead end of the column D is cut off periodically by a slicing wire 45 suspended between the legs of a yoke 46, Figure 9, attached to the piston rod 47 of an air cylinder 48 adjustably secured to a platform 49 supported by posts 50, Figure 5. The actuation of the air cylinder is controlled by a pressure differential valve 51, Figures 9 and 10, having an inlet connected by pipe 52 to a pressure equalizing tank 53 in which pressure is maintained by a compressor 54 driven by motor 55. On the outlet side of the valve is a pipe 56 leading to the lower end of the cylinder 48, with a regulating valve 56′ therein. Another pipe 58, leads from valve 51 to the upper end of cylinder 41, Figure 5, and has a regulating valve 58′ therein. 57 is a vent pipe in valve 51, Figures 5 and 10.

When cam 68, Figure 9, depresses pin 60, valve 59, Figure 10, permits the escape of air pressure in cavity 59a through hole 62 and vent 63 while air leaking through vent 74 into chamber 59b pushes piston 61 to the left. This connects pipe 58 with the tank 53 through duct 64 and cut away portion 65 in the valve body to force the cutting wire downwardly through the clay. Air ahead of the air cylinder piston is vented by backflow through pipe 56, notch 66 and vent pipe 57.

Cam 68 is mounted on the drive shaft 69 of a variable speed transmission 67, Figures 5 and 9, having a control 70 for adjusting the shaft speed. A motor 71 drives the transmission. It is preferred to cut through the clay quickly and therefore the pin 60 which unseats the ball valve is held in only for such length of time as required for the cutting wire to reach the bottom of its stroke under full tank pressure. The cam 68 is developed so as to release the pin as soon as this happens, and spring 72, Figure 10, forces the ball valve back in its seat whereupon air leaks through vent 73 into the chamber 59a forces piston 65 to the right due to the area differential occasioned by stem part 59a which is exposed to atmospheric pressure. This connects pressure tank 53 with pipe 56 through duct 75, pipe 58 being vented to atmosphere thereby raising the cutting wire rapidly. Should clay be cut from the advancing procession D on the return stroke it does not matter because the material will fall into the pug mill, and for that matter, the cam as illustrated at 83 in Figure 13, may be developed with two control surfaces 84 and 86 so as to cause the wire to cut a full charge on each half stroke.

It will be observed that the cutting wire moves vertically whereas the procession D is projected at an angle to the vertical. This causes the wire to cut across the column at an angle thereto thus producing a slice of clay composed of material from a cross section of a plurality of filter cakes at various annular zones. It is preferred to form very thin slices of clay to thereby segregate hard and soft zones, see Figure 14, wherein 137 indicates the excess hard peripheral zone, 138 the excess soft central zone and 139 the intermediate, optimum consistency zone, into its smallest practical portions prior to deposit in the pug to thereby predetermine the largest particle that can possibly be incorporated in the ware, thus facilitating and greatly reducing pugging requirements thereof. The periodicity of the cutting wire stroke and the speed of travel of procession D may be adjusted to obtain slices of clay of any desired thickness.

The pug mill 41 is of conventional construction having a hopper 44 for receiving the slices of clay cut off from the procession D which is located in close proximity to the leading end of the procession. Said pug mill is driven by a motor 76, Figure 2, through an adjustable variable speed transmission 77 which may be automatically controlled if desired in the manner previously described in connection with the structure of Figure 5. Connected to the pug mill outlet is a downwardly curved pipe 78 having its discharge outlet at a lower level than the pug mill directly over the clay feeding position of an automatic pottery-ware jiggering machine 81 resting on the floor therebelow at one side of platform 37, Figure 2. Slices of clay are automatically cut off from the extrusion through pipe 78 and deposited on successively presented molds 80 to be fabricated into ware.

In front of sprockets 38 or drum 35, Figure 5, is positioned a curved guard 82 for guiding the supports 6 around the axis of shaft 34 and into the clearance space between a downwardly inclined belt 85 and the chains 9 and 10. The purpose of belt 85, which runs between a roller 87 supported in bearings on posts 36, Figures 1 and 5, and a roller 88 on sprocket shaft 89 supported by posts 90 resting on the floor is to support and control the rate of advance of the slatted supports 6, in inverted position in engagement with the chains 9 and 10 whilst they are being returned to a lower level. The direction of travel of chains 9 and 10 is reversed as they travel around sprockets 91 on shaft 89 and a horizontal run is provided between sprockets 91 and sprockets 92 on posts 93, this being the unloading zone where the supports 6 are removed from the conveyor by trucks 3 which may be backed into the space between the chains as in the loading of clay into the conveyor, however with the platform 4 in lowered position to be raised to lift a slatted support 6 from the chains and carry the same back to the filter presses for refilling.

Instead of cutting off the lead end of procession D by means of a reciprocating cutting wire, I may employ the pug mill knives 94, Figure 11, to do so, by providing an opening in the side of the pug mill barrel adjacent the knives and connecting thereto a tapered rectangular section inlet nozzle 95. The pug mill in such event would be raised to the proper level so that the side opening would be in line with the procession. I prefer to reduce the diameter of the procession D and change the cross sectional shape thereof from round to rectangular and to do so have provided a reducer 96 which is interposed between the ramp 42 and the nozzle 95 and rests on a frame 97 and projects upwardly at the same angle of inclination as the procession D. Said reducer comprises four roller supported belts 98, 99, 100 and 101 arranged on the frame work to form a rectangular passage, Figure 12, converging toward the nozzle 95 through which the lead end of the procession D travels, the lower belt 98 being driven by a chain 102 driven by sprocket shaft 34 so that the movement of the belt will be coordinated with the speed of travel of the procession D. As the pug mill knives revolve, they will shave off slices of clay from the leading end of the procession to be pugged and extruded as aforesaid.

I claim:
1. The method of feeding a pug mill with clay which comprises, forming a column composed of plastic filter cakes with the side surfaces of the cakes in abutting relationship, moving the column as a unit in endwise fashion towards an elevated cutting off position over the pug mill, slicing downwardly through the column at an angle to the longitudinal centerline thereof to produce a slice of clay composed of material from a plurality of cakes and to drop the slice by gravity into the pug mill.

2. In the manufacture of potteryware, the method of feeding a pug mill with clay which comprises, forming a procession of forwardly inclined overlapping filter cakes laid one against the other, moving the procession along an inclined plane to a cutting off position, slicing across the leading end of the procession in such fashion as to produce laminated bodies of clay, and from time to time adding to said procession additional filter cakes.

3. The method of feeding clay to a pug mill which comprises, forming a column composed of plastic filter cakes with the side surfaces of the cakes arranged in abutting relationship, moving the column as a unit in endwise fashion through a moisture modifying zone, to an elevated cutting off position, slicing through the column at an angle to the longitudinal centerline thereof to produce a slice of clay composed of material from a plurality of cakes and dropping the slice by gravity into the pug mill.

4. The combination of a pug mill with a support for carrying filter press cakes from a filter press to a segregating zone, conveying means for said support, segregating means for segregating material from said cakes in said zone and means for depositing filled supports directly on said conveying means and for removing empty supports therefrom and carrying them away.

5. In combination with a pug mill, a support for carrying filter press cakes to a segregating zone, means for segregating clay from said cakes in said zone, conveying means for transporting said supports to said zone and means for depositing filled supports on said conveying means and removing empty supports therefrom and carrying them away.

6. In combination with a pug mill, movable carrying means formed to support a procession of filter press cakes laid one against the other, a chamber through which the procession passes, means for supplying moisture to said chamber and segregating means arranged to detach material from the leading end of said procession to be deposited in said pug mill.

7. In combination with a pug mill, a support for carrying filter press cakes in horizontally stacked relation to a segregating zone, means for segregating clay from said cakes in said zone, conveying means for transporting said supports to said zone arranged to move said supports along an inclined plane to project the filter cakes at an angle relative to the path of travel of the segregating means to enable the cutting off of laminated bodies of clay from the stack of filter cakes, and means for depositing filled supports on said conveying means and removing empty supports therefrom and carrying them away.

8. In combination with a pug mill having an inlet and movable macerating members, movable carrying means formed to support a procession of filter cakes laid one against the other, means for leading the forward end of the procession through the pug mill inlet to be cut off by the macerating members and a reducer for changing the cross sectional size of the procession before entering the pug mill.

9. Apparatus for feeding clay to a pug mill comprising a support for carrying filter press cakes, conveying means for carrying said support to a cutting off position, clay segregating means at said position, means for moving said conveying means and means for depositing filled supports directly on said conveying means and for removing empty supports therefrom and carrying them away.

10. Apparatus for feeding clay to a pug mill comprising a movable support formed for carrying a procession of filter cakes stacked on edge and laid one against the other to a cutting off position, a chamber through which the support is carried, means for supplying moisture to said chamber and segregating means for detaching material from the leading end of the procession of filter cakes.

11. In the manufacture of potteryware, the method of feeding clay to a pug mill which comprises, forming a column of filter cakes arranged in overlapping relation and in forwardly inclined position relative to the vertical, moving the columns along an upwardly inclined plane, cutting across the leading end of the column in a vertical direction to detach a laminated slice of clay composed of the material from several filter cakes and depositing the cut material in a pug mill.

12. Apparatus for supplying clay to a pug mill comprising, a conveyor having detachable filter press cake supports, and a section arranged in an inclined plane to project the end of a column of filter cakes over a pug mill, and a cutter at the upper end of the inclined section of the conveyor for cutting off clay and dropping the same into the pug mill.

13. Apparatus for supplying clay to a pug mill comprising, a conveyor having detachable filter press cake supports, and a section arranged in an inclined plane to project a column of cakes above the pug mill into a cutting off position, means for detaching bodies of clay from the column and means for loading filter press cake supports onto the conveyor.

WILLIAM J. MILLER.

REFERENCES CITED

The following references are of record in the file of this patent:

UNITED STATES PATENTS

| Number | Name | Date |
| --- | --- | --- |
| 49,396 | Fulton | Aug. 15, 1865 |
| 78,181 | Brown | May 26, 1868 |
| 295,298 | Smith | Mar. 18, 1884 |
| 320,865 | Frey | June 23, 1885 |
| 399,025 | Evans | Mar. 5, 1889 |
| 418,962 | Steele | Jan. 7, 1890 |
| 964,512 | Handle | July 19, 1910 |
| 1,657,172 | Monroe | Jan. 24, 1928 |
| 1,740,631 | Stockmar | Dec. 24, 1929 |
| 1,884,346 | Stewart | Oct. 25, 1932 |
| 2,180,757 | Hermann | Nov. 21, 1939 |
| 2,185,459 | Hardgrove | Jan. 2, 1940 |
| 2,277,248 | Nardi | Mar. 24, 1942 |
| 2,335,925 | Emerson | May 9, 1943 |
| 2,359,995 | Korum | Oct. 10, 1944 |